Feb. 26, 1935. J. C. RAH ET AL 1,992,392
MOLDED INSULATED BUS BAR
Filed Oct. 24, 1931
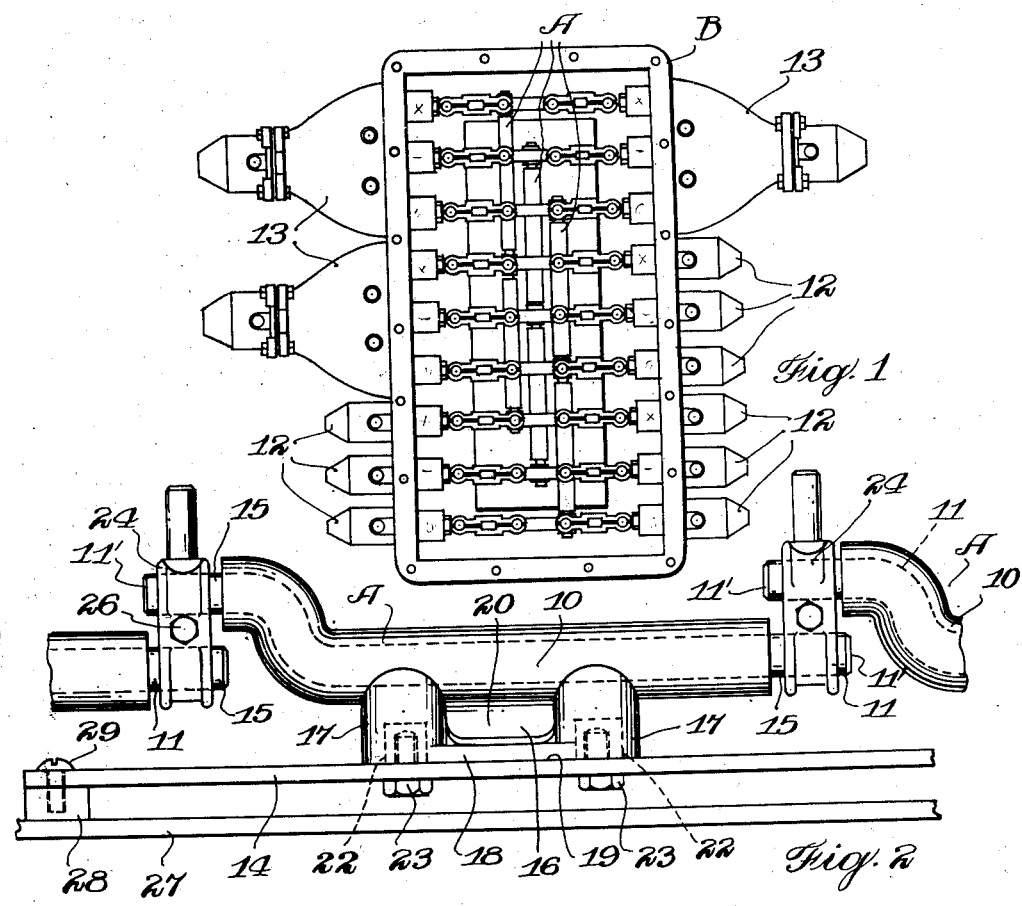
Fig. 1
Fig. 2
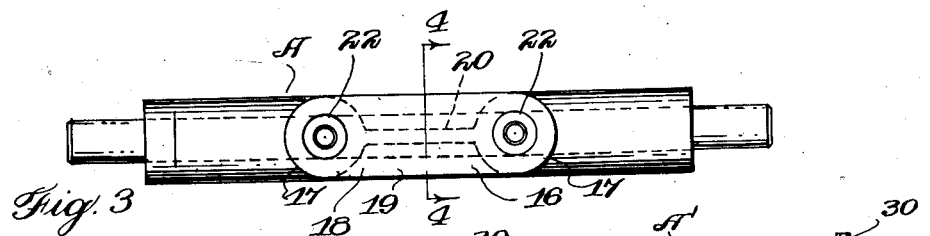
Fig. 3
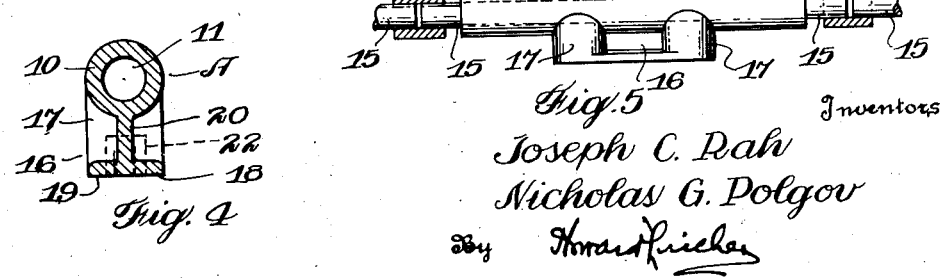
Fig. 4
Fig. 5
Inventors
Joseph C. Rah
Nicholas G. Polgov
By Howard Fricke
Attorney Patented Feb. 26, 1935

1,992,392

UNITED STATES PATENT OFFICE 1,992,392

MOLDED INSULATED BUS BAR

Joseph C. Rah and Nicholas G. Polgov, Chicago, Ill., assignors to Delta-Star Electric Company, Chicago, Ill., a corporation of Illinois Application October 24, 1931, Serial No. 570,804

5 Claims. (Cl. 247—14)

This invention relates to a molded bus bar for use in electric underground distribution boxes, where only a small space is available and which permits the connectors to run close to the bus bars without forming a corona and preventing short circuits in the distribution box.

A feature resides in forming the bus bar of the desired shape so as to fit between certain distances and connections in the distribution box in which it is to be used, and then molding an insulation over the same with the ends of the bus bar exposed so as to be attached to the electrical terminals in the distribution box to secure the bus bar between the terminals with good electrical contact. The exposed ends when gripped in the connectors or terminals are virtually covered so that the remainder of the bus bar is entirely insulated over its body between its ends.

It is also a feature to provide an insulated bus bar for close work in distribution boxes and other similar places and wherein the body of the bar is covered with an insulation of any suitable material which is highly resistant to electrical potential and heat. Further, the insulation of the bus bar is provided with a suitable bracket or supporting means or base portion which is formed with suitable metal sockets which are tapped with a thread so that the base of the insulation covering the body of the bus may be secured to hold the bus bar in rigid relation when in operation. This construction is particularly adapted to underground distribution boxes where there is only a limited space and where other connectors must extend in close proximity to the bus bar. Thus, we provide a structure which is very desirable for use in this manner and its peculiar nature has adapted it to a use in distribution boxes and close places which accomplishes the desired results in a very efficient manner.

A desirable feature is provided in the forming of an insulating bead over a bus bar which has been formed into the desired shape before the insulation is formed over the same and provides a bracket means integral and of the insulating material projecting from the main insulating part which covers the body of the bus bar and wherein the bracket contains suitable threaded metal cups which are anchored in the bracket of the insulating material being embedded therein when the insulating material is formed about the bus bar. Thus, we provide a new and novel method of making bus bars with an insulation and bracket supporting means for the body of the bus bar with only the ends thereof exposed for making contact with an electrical terminal, and arranged to provide a unit type of distribution box wherein one size of bus bar is used regardless of the number of three phase feeders accommodated by said box. The manner of using similar bus bars in a tandem connection is illustrated in Figure 1, as will hereinafter be described.

These features, together with other details and objects will be more fully and clearly set forth in the specification and claims.

In the drawing forming a part of this specification:

Figure 1 is a top plan view of an underground distribution box, showing a practical embodiment of our invention in a box of this type.

Figure 2 illustrates a side elevation view of one of the bus bars mounted in position within the distribution box.

Figure 3 is a bottom plan view of the bus bar illustrated in Figure 2, illustrating the mounting bracket.

Figure 4 is a cross-sectional view on the lines 4—4 of Figure 3.

Figure 5 illustrates a slightly different form of bus bar.

The bus bars A are adapted for use, particularly where only a limited space is provided. The bus bars A are thus particularly adapted for use in underground distribution boxes B, such as is illustrated in Figure 1 of the drawing. It will be noted in this figure that several bus bars A are mounted in parallel relationship and are mounted relatively close together. This is permissible because of the molded insulating covering 10 encircling the conductor 11 by means of which electricity may be conducted through the bus bar A.

A distribution box B is provided with cable terminators 12 and multiple cable terminators 13. If desired, the multiple cable terminators 13 may be withdrawn and single cable terminators 12 may be substituted therefor. It is understood that other types of underground distribution boxes B may be employed if desired and other types of cable terminators 12 and 13 may be used in place of the type illustrated in the drawing. By lengthening the box B, additional inlet and outlet terminal units may be added, and similar bus bars A connected in tandem with those positioned as illustrated.

The bus bars A are formed of a copper rod 11 which may be bent into the desired form to provide suitable connections within the underground terminal box B. This rod 11 may be tapered somewhat at the ends 11' thereof in order to insure easy insertion of the clamp connecting members adapted to conduct electricity to and from the ends of the rod 11. As illustrated in Figure 2 of the drawing, one end of the bus bar A is offset from the axis of the remainder of the bus bar in order to space one end of the bar away from the insulation mounting panel 14 to provide sufficient space for suitable end clamping members or connecting lugs.

In closing the entire body of the copper rod with the exception of a short connecting portion 15 at either end of the same which remains exposed, is molded a thick insulating coating of phenol condensation product or other similar material. This molded insulation covering is sufficiently thick to prevent corona between adjacent bus bars A and to protect the bars against short circuits throughout the greater portion of the length of each bus bar. As the insulation is molded directly over the bus bar, this insulation forms virtually an integral part of the bus bar and permits the bus bars to be used closely adjacent one another without danger of arcing between the bars. The bars A are preferably mounted upon the mounting panel 14 in staggered relationship, as illustrated in Figure 1 of the drawing, in order that the ends of the same are not closely adjacent one another. Accordingly, danger of corona between connecting ends of adjacent bus bars is in this way obviated.

Integral with the molded covering 10 of the rods 11, we provide a bracket attaching means 16 which provides a manner of mounting the bus bars A to the mounting panel 14. The bracket 16 comprises a pair of spaced cylindrical lugs 17 provided with a flat connecting flange 18 formed flush with the mounting panel engaging surface 19. Thus, a large plate-like flat engaging surface is provided which acts to hold the bus bar A correctly. A centrally disposed connecting web 20 joins the flange 18 with the body of the covering 10 and also acts to connect the cylindrical lugs 17.

Centrally positioned on each of the cylindrical lugs 17, is embedded a brass insert 22. These inserts 22 may be molded directly into the molded insulation covering 10 or may be placed in apertures formed for the purpose after the molding is completed. The inserts 22 are internally threaded to accommodate the attaching bolts 23 which act to hold the bus bar A to the mounting panel 14.

The connecting lugs 24 for electrically connecting the ends of the bus bar A with suitable connectors 25 may be of any desired form to accomplish the desired purpose. These lugs 24 preferably clamp over the exposed ends 15 of the bus bar A and are held tightly in this position by means of the bolt 26. The connectors 24 act to connect the ends of the bus bars A with the cable terminators 12 and 13 and while these connectors 25 are illustrated as being of a particular form, it is understood that these connectors may be of any suitable type to accomplish the result. The connectors 24 may serve to connect the ends of bus bars A in tandem relationship when more than two three phase units are provided in the box B. The manner of connecting the ends of adjacent bars A may be seen in Figures 1 and 2 of the drawing.

The mounting panel 14 is spaced from the bottom member 27 of the distribution box B by means of lugs 28 which are formed integrally with the bottom 27. The bus bars A are mounted upon the insulating mounting panel 14 and the bolts 23 are tightened to hold the bars tightly and securely to the mounting panel 14 before this panel is placed in position within the distribution box B. When the panel 14 is in proper position within the distribution box, the bolts 29 extending into the lugs 28 are put into place and tightened holding the panel 14 rigidly in position within the box B.

Figure 5 illustrates a modification of bus bar A' which is straight rather than offset at one end, as is the bus bar A. It is obvious that the bus bar A' requires more longitudinal room for connection, as the exposed ends of this type of bus bar cannot overlap for a vertical connection as can the bus bars A, as illustrated in Figure 2. The bus bars A' are adapted to be connected in tandem by means of connectors 30. The molded insulation covering, and the bar supporting means is similar to that described in connection with the bus bars A.

When the bus bars A are in the position illustrated in Figure 1 of the drawing, it may be seen that the distance between the exposed portions of the adjacent bus bars is virtually the same as the distance between the various connectors 25 within the box B. Accordingly, unless the box B is greatly overloaded over its capacity, there is no danger of corona between the exposed ends of the bus bars A and the molded insulation covering the body portion of these bus bars is sufficiently heavy to obviate any danger of arcing between the bus bars even though they are positioned closely adjacent one another. Accordingly, the distribution box B can be more compact as there is no necessity of spacing the bus bars A apart sufficiently to prevent corona.

In accordance with the patent statutes, we have described the principles of operation of our molded bus bar and while we have endeavored to set forth the best embodiment thereof, we desire to have it understood that this is only illustrative of a means of carrying out our invention and that other modifications and obvious changes may be made within the scope of the following claims without departing from the spirit of the invention.

We claim:

1. A molded insulation for bus bars including, a tubular-like formation of insulation, a bus bar extending through said tubular insulation, bracket supporting means formed of insulating material projecting from the sides of the tubular insulating portion, said bracket including a web-like portion extending longitudinally from the tubular portion of said insulating material, and attaching sockets formed integral of the insulating material having a threaded recess to permit the insulating material to support the bus bar extending therethrough by bolts extending into said threaded sockets.

2. The method of forming an electrical bus bar with a coating of insulating material extending over the major portion of the same consisting in molding the insulating material over the body of the bar and forming an integral supporting bracket for the bus bar projecting from the insulating material extending over the same.

3. A sectional bus bar including, a series of bus bar members each formed with a concentric insulation coating extending over the major portion thereof, an attaching bracket extended from and formed of said insulation adapted to support each bus bar to an insulating supporting panel in a terminal box, and electrical connectors adapted to form clamps over the ends of said bus bars to connect a series of the same together to provide electrical bus connectors for electric circuits in a terminal box.

4. An electrical terminal box formed of insulating material having two or more three phase circuit inlet and outlet openings, connectors for said openings to provide electrical leads into said terminal box, and sectional bus bars formed with a firm rigid insulation extending individually over the major portion of each of the same, terminal ends exposed beyond said insulation, electrical connectors for connecting adjacent ends of similar bus bars, and a bus supporting bracket formed integral with said insulating material covering the body of said bus bar.

5. An electrical terminal box formed of insulating material in combination with two or more three phase electrical inlet and outlet circuits, and sectional bus bars having an insulation coating formed individually over the major portion of each of the same and supported individually thereby within said terminal box to provide electrical leads in said terminal box of a sectional nature.

JOSEPH C. RAH.
NICHOLAS G. POLGOV.